(No Model.)
J. W. PHILLIPS.
CULTIVATOR.
No. 467,829. Patented Jan. 26, 1892.
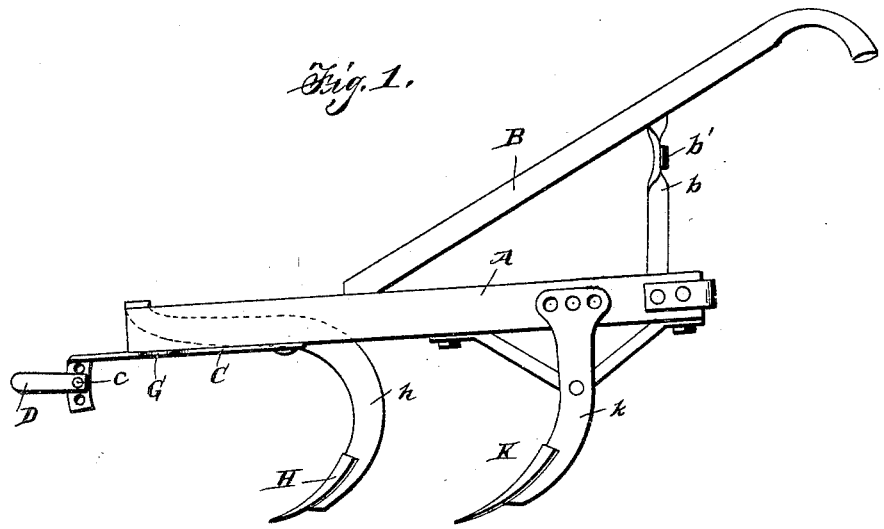
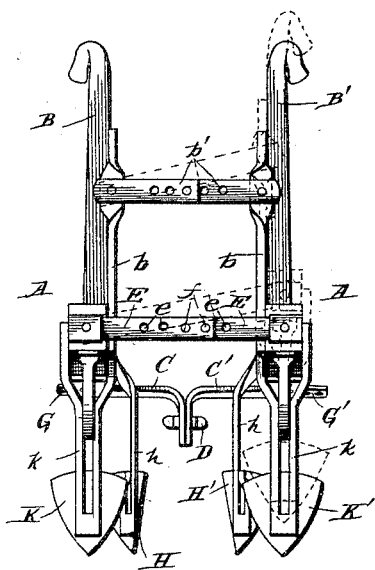
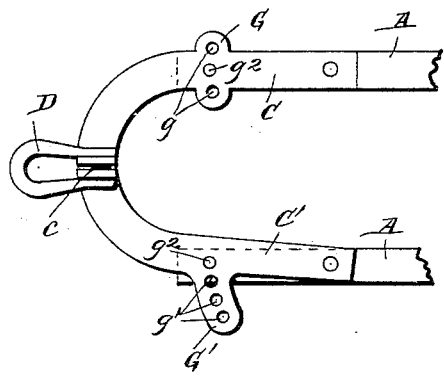
Witnesses
Samuel Ket
Philip C. Masi
Inventor
J. W. Phillips
by E. W. Anderson
his Attorney

UNITED STATES PATENT OFFICE.

JAMES W. PHILLIPS, OF GEEVILLE, MISSISSIPPI.

CULTIVATOR.

SPECIFICATION forming part of Letters Patent No. 467,829, dated January 26, 1892.

Application filed October 8, 1891. Serial No. 408,151. (No model.)

*To all whom it may concern:*

Be it known that I, JAMES W. PHILLIPS, a citizen of the United States, and a resident of Geeville, in the county of Prentiss and State of Mississippi, have invented certain new and useful Improvements in One-Horse Cultivators; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a side view. Fig. 2 is a bottom plan view, and Fig. 3 is a detail view.

The invention has relation to certain improvements in cultivators, the object being to produce an implement of this kind which will be capable of use either straddle-row or between the row, which will be adjustable in all parts, and which will be effective in its operation, simple in construction, and capable of being manufactured at a comparatively low cost.

With these objects in view the invention consists in the novel construction and combination of parts, as hereinafter described, and pointed out in the claim.

In the accompanying drawings, the letters A A' designate the parallel side beams or bars, upon which are supported the handles B B' by the braces $b$. To the forward portions of these bars A A' are pivotally or loosely secured the arms C C', which are curved inwardly, meeting at their forward ends, where they are connected by a loose bolt or pivot $c$, which also passes through and secures thereto an eye or clevis-ring D, to which the draft is attached.

To the rear end of each bar A A' is pivotally secured a bar or strap E E, the two bars being adapted to overlap at their meeting ends and provided each with a series of pin-apertures $e$, any two of which, when in alignment with two of the opposing bars, receive the pins or bolts $f\!f$, thus providing for the lateral adjustment of the rear ends of the side beams.

The arms C C' have each a lug or projection G or G', provided with a series of apertures $g$ or $g'$, through any of which may be passed the securing-bolts $g^2$, which engage the side beams, and thereby provide for the lateral adjustment of the forward ends thereof. The braces $b$ for the handles are also connected by the adjustable brace-links $b'$.

H H' are the two forward shares or plows, which are secured to the lower portions of forwardly-curved shanks $h\,h$, which are themselves secured at their upper portions, preferably to the inner edges of the side beams.

K K' are the rear shares, which are usually somewhat larger than the shares H H' and which are secured to the bifurcated shanks $k$ $k$, the arms of which at their upper ends are adjustably secured to opposite sides of the beams near their rear ends. The shares K K', as well as shares H H', if desired, may have a vertical adjustment with relation to their shanks.

Fig. 1 of the drawings illustrates the cultivator as intended for use as a straddle-row. If it is desired to straddle the row to a greater extent, the forward end of the right beam is moved outwardly on the lug G, which will throw the horse more off the row.

When the crop becomes too large for the use of a straddle-row cultivator, the two forward shares H H' are removed and the back share K on the right-hand beam, with its shank, is moved forwardly in advance of the share K' on the left beam.

It is obvious that by reason of the loose connections above described each of the beams A A' will have a vertical movement independent of the other, which greatly facilitates the guidance of the cultivator. In case, also, it is desired for any reason to cause the shares on one side to dig deeper than on the other it is only necessary to bear greater weight on the corresponding handle-bar.

The braces $b\,b'$ are removably secured to the beams, and may be connected either to the inner or to the outer edges thereof, according as it is desired to throw the handles a greater or less distance apart.

Having described my invention, what I claim as new, and desire to secure by Letters Patent, is—

A cultivator comprising parallel side beams A A', inwardly-curved loosely-connected arms C C′, loosely secured to the forward portions of said beams, said arms each having a lateral lug or projection formed with a series of perforations and providing for the lateral adjustment of the forward portions of said beams, the bars or straps E E, loosely connecting the rear portions of said beams and themselves adjustably connected, adjustable shares secured to said beams, and adjustable handles supported thereby, substantially as specified.

In testimony whereof I affix my signature in presence of two witnesses.

JAMES W. PHILLIPS.

Witnesses:
G. H. SLOAN,
J. S. THOMPSON.